United States Patent [19]

Tsao

[11] Patent Number: 4,811,239

[45] Date of Patent: Mar. 7, 1989

[54] DIGITAL FACSIMILE/IMAGE PRODUCING APPARATUS

[76] Inventor: Sherman H. M. Tsao, 2004 Biloxi Cir., Plano, Tex. 75075

[21] Appl. No.: 18,938

[22] Filed: Feb. 25, 1987

Related U.S. Application Data

[63] Continuation-in-part of Ser. No. 620,504, Jun. 14, 1984, Pat. No. 4,651,287.

[51] Int. Cl.$^4$ .................. G06F 15/66; H04N 1/00; H04N 1/387
[52] U.S. Cl. .................. 364/519; 358/75; 358/283; 358/284; 364/518
[58] Field of Search .............. 364/518, 519, 520, 521, 364/523; 358/75, 80, 283, 284

[56] References Cited

U.S. PATENT DOCUMENTS

| | | | |
|---|---|---|---|
| 4,051,536 | 9/1977 | Roetling | 358/283 X |
| 4,196,454 | 4/1980 | Warren | 358/283 |
| 4,246,614 | 1/1981 | Knox | 358/283 |
| 4,339,774 | 7/1982 | Temple | 358/283 |
| 4,449,150 | 5/1984 | Kato | 358/283 |
| 4,533,957 | 8/1985 | Iinuma | 358/283 X |
| 4,547,811 | 10/1985 | Ochi et al. | 358/283 X |
| 4,551,768 | 11/1985 | Tsuchiya et al. | 358/283 |
| 4,622,595 | 11/1986 | Hisatake et al. | 358/283 X |
| 4,677,571 | 6/1987 | Riseman et al. | 364/519 |

Primary Examiner—Felix D. Gruber
Attorney, Agent, or Firm—Hubbard, Thurman, Turner & Tucker

[57] ABSTRACT

An improved image producing apparatus relating to the display of images including text, line graphics, continuous tone photographs, and halftone pictorials is disclosed. The apparatus includes, for example, a CCD scanner for scanning a scene for producing a data image of a scene for a processor. The processor includes means for transforming the data image to a set of assigned density values according to a look-up set of assigned density values stored therein, means for partitioning a page of image data into adjoining blocks of pixels such that each individual block can be further partitioned into smaller sized sub-blocks until the smallest sub-block is reached, which is one pixel; microstructure control means for adding a screen function to the transformed image data or introducing cumulative row error sums for influencing the order of dot placement and not to alter the averaged image density for each block of pixels; and means for recursively processing the data for error minimization in successive steps of refinement with each additional step improving the image data approximation of the previous step until the print error sum of each block is minimized. A decoder then decodes the image data block for printing by a printer.

12 Claims, 8 Drawing Sheets

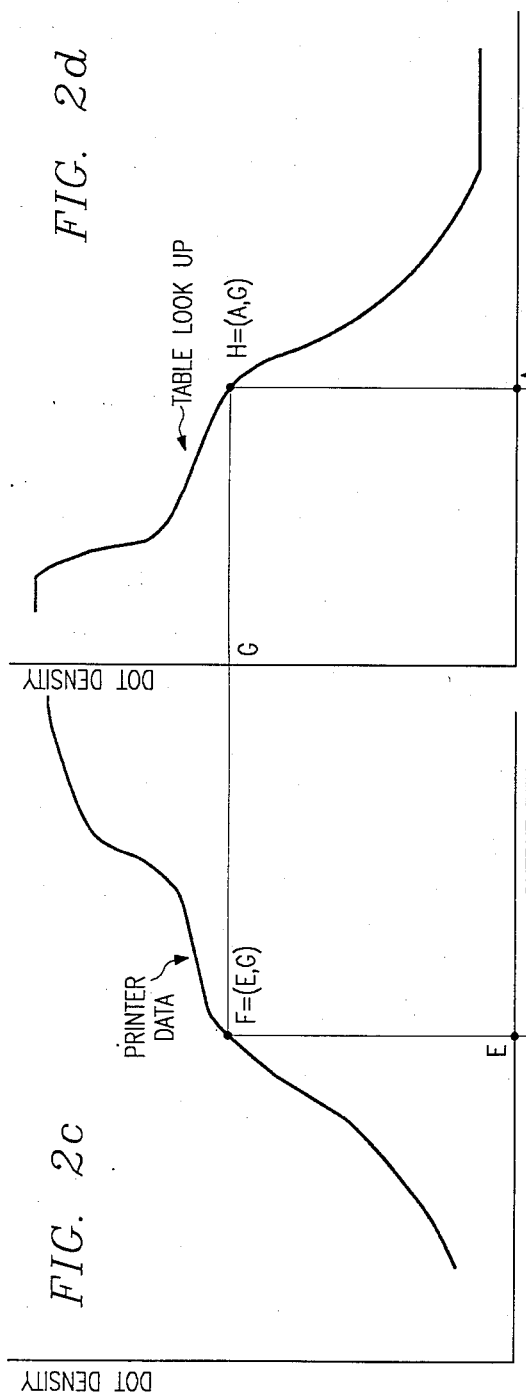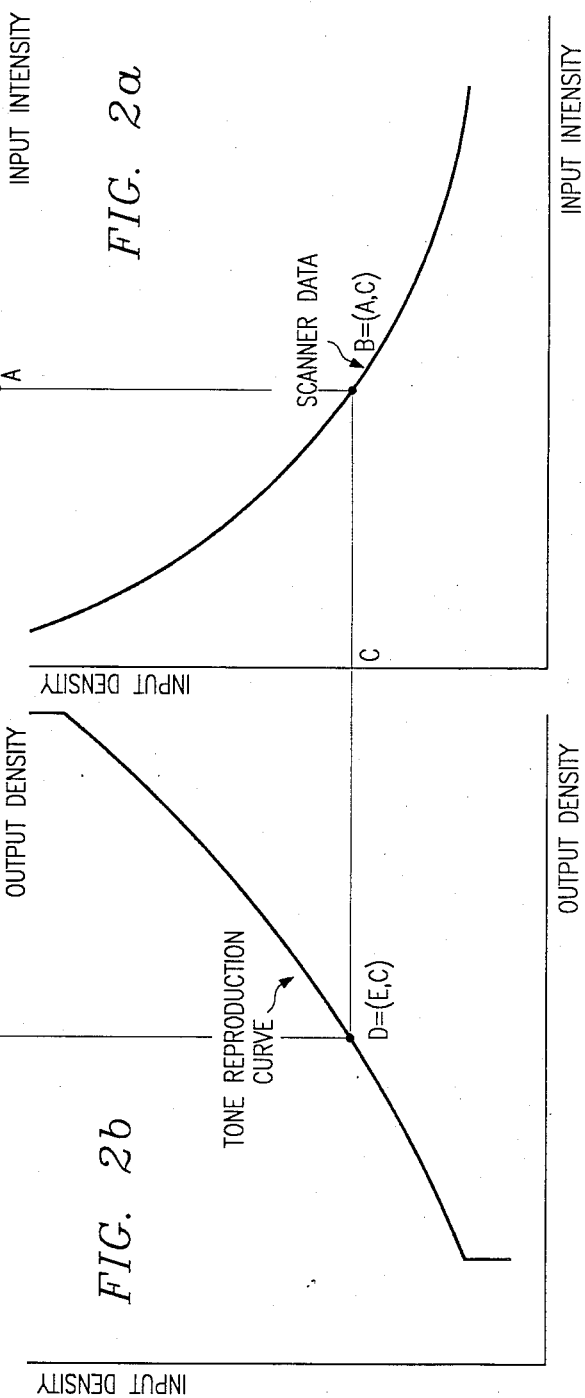

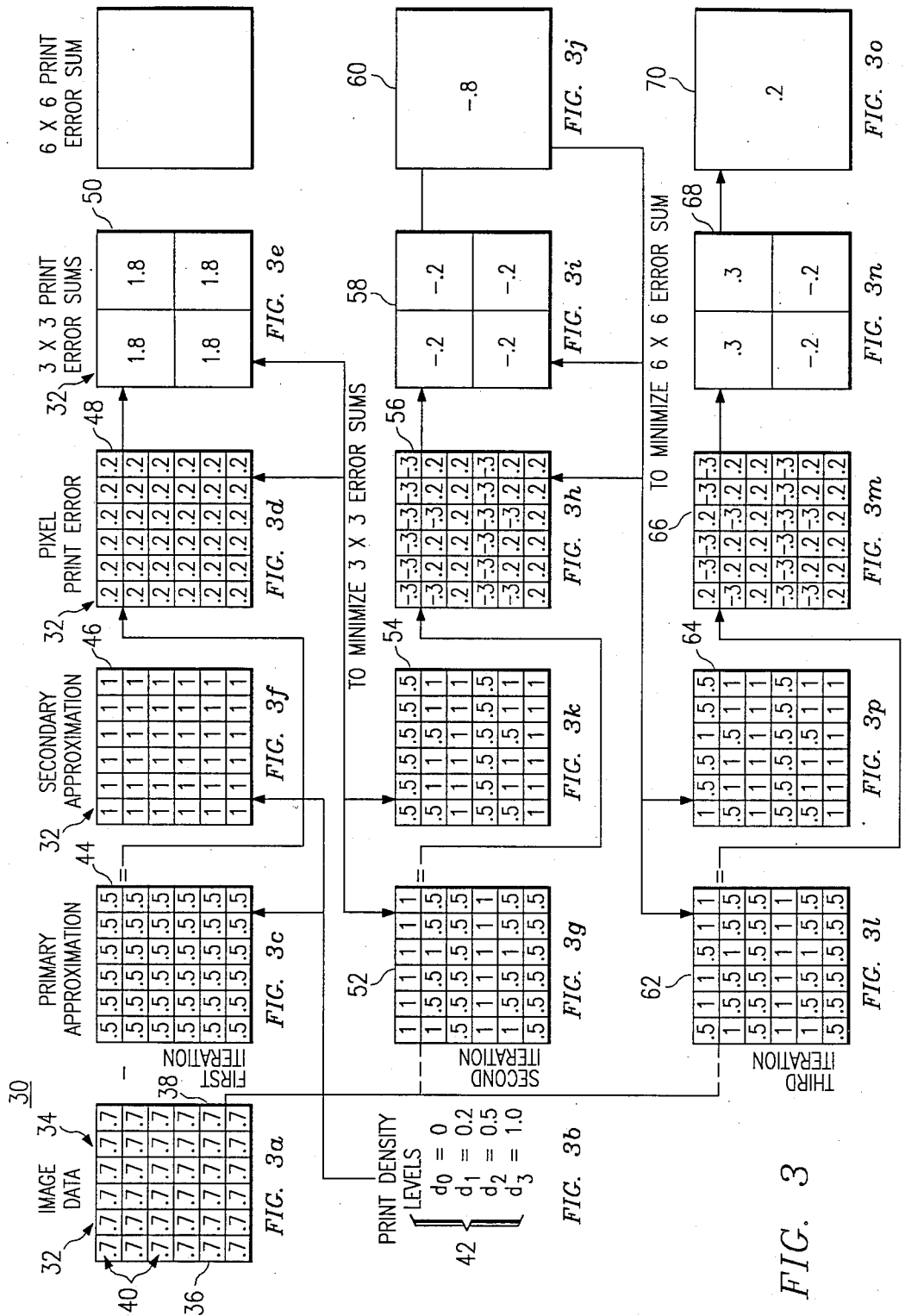

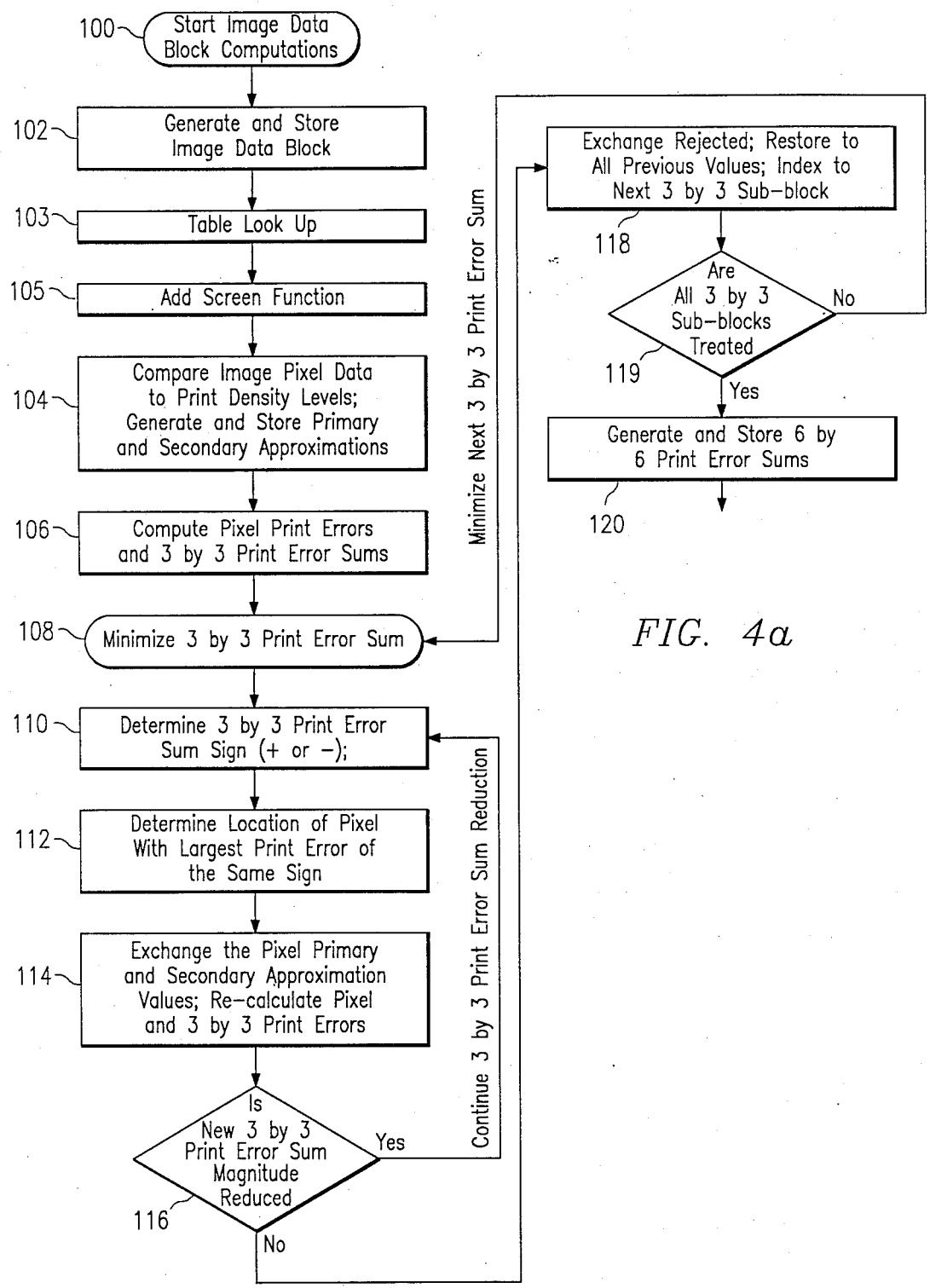

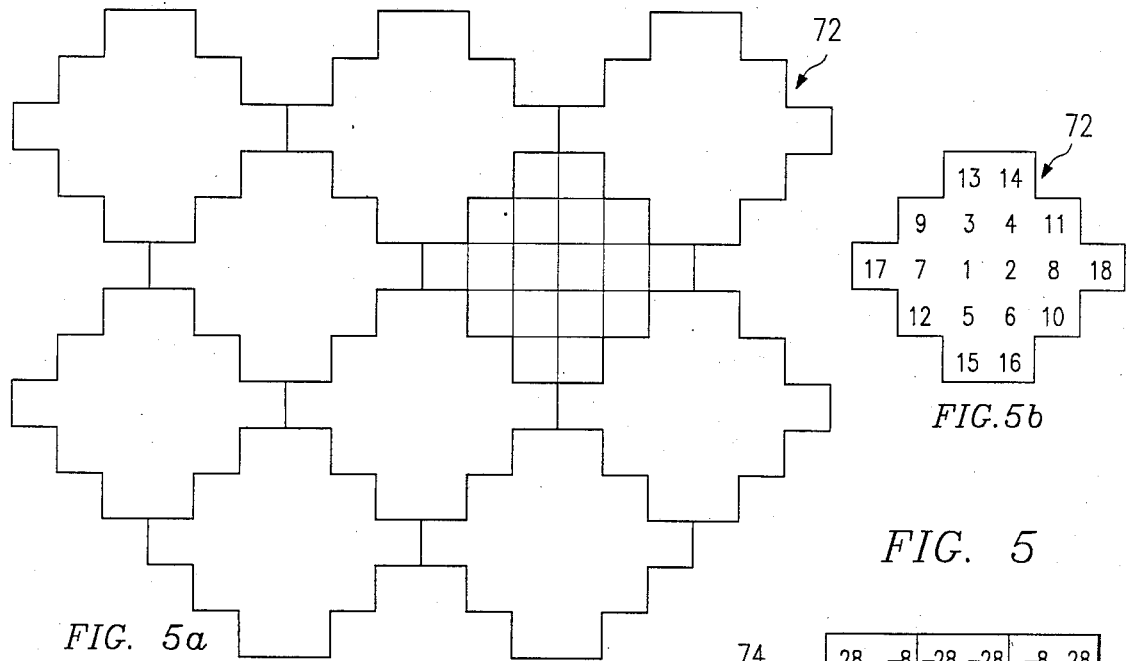
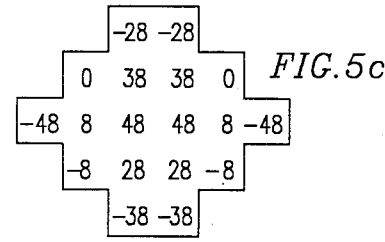
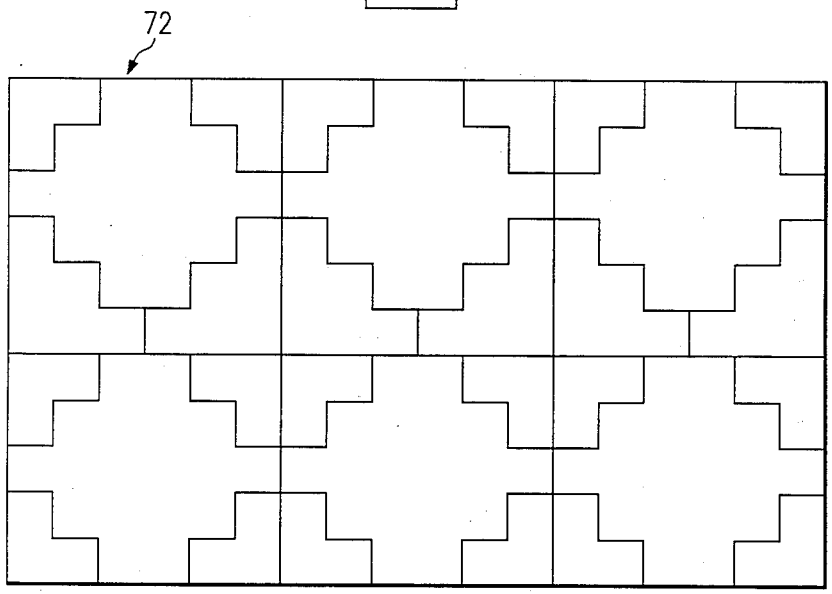
FIG. 5a
FIG. 5b
FIG. 5c
FIG. 5d
FIG. 5e
FIG. 5

DIGITAL FACSIMILE/IMAGE PRODUCING APPARATUS

This application is a continuation-in-part of patent application Ser. No. 620,504, filed June 14, 1984, for a "Digital Image Processing Algorithm for Output Devices, with Discrete Halftone Gray Scale Capability" now U.S. Pat. No. 4,651,287.

BACKGROUND OF THE INVENTION

The quality of images reproduced over a television, a display panel, or by a printing system may be judged with respect to three characteristics: tone scale, image sharpness, and graininess. For digital type of image reproduction devices such as display panels, television monitors, and dot matrix printers there is a direct dependence of these characteristics on the reproduction device system parameters. The tone scale image quality depends on both the system tone reproduction curve which defines a gray scale transformation from the original to the reproduced image, and on the number of levels of gray the system is capable of reproducing. The sharpness factor is directly affected by the x and y resolutions of the reproduction device. Higher resolution devices are generally better at reproducing fine details, thereby yielding sharper images. Finally, graininess refers to those image noises which are usually process related and are not part of the original image.

The role of image processing is to decide whether or not to display or to print at each pixel location one of several size dots such that the reconstructed image closely resembles the original. Jun Okya and Yukie Tokunaga in "Gray Scale Printing on Plain Paper Using Thermal Ink-Transfer Imaging", *Journal of Imaging Technology*, Vol. 10, No. 2, April 1984, discuss a three level image processing algorithm for image reproduction.

Other known digital image processing algorithms are for binary fixed size print dots or display spots. They all are able to reproduce well some of the image types: text and line drawing, continuous tone images, and halftone pictorials. But they are unable to reproduce well all image types. The present generation of printers and displays poorly mimic the halftone technique of the printing industry because of insufficient dot resolution. Thus it would be advantageous if the printers and displays could overcome these short comings in a system that reproduces high quality images of all types.

SUMMARY OF THE INVENTION

In accordance with the present invention, input image data which can be either scanned image data or that computed from mathematically defined objects is first transformed into a more suitable numerical unit for later computations. The transformation is done through a look up table which is constructed to encompass also any desired tone level enhancements. Next, a page of image data is partitioned first into adjoining blocks of pixels such that each individual block can be further partitioned into smaller sized sub-blocks and so on until the smallest sub-block possible is reached, which is the individual pixel.

Over each block a screen function is added to the transformed image data for processing. The screen function is so constructed that it causes the formation of the desired halftone screen pattern over areas of uniform gray level but will not affect areas of high spatial frequency with sharp gray level contrasts. The image processing computation is carried out recursively according to the concept of error minimization in successive steps of refinement with each additional step improving upon the image data approximation of the previous step.

At the first step, the computation associates with each pixel image data the two closest of several available printable levels of the output device. Typically, one represents over printing and the other under printing. The printable level which is closer to the image data is selected as the first approximation. In the next step, a small number of adjoining pixels forming a small sized sub-block is examined together in order to minimize the error sum of the image data approximation for that sub-block. This is done by judiciously exchanging at certain pixel locations their first printable choices for the alternate ones which, though creating larger errors in their image data approximations at these locations, collectively reduce the overall image data error for the whole sub-block.

At the next step, a number of adjoining small sized sub-blocks forming a larger sub-block is examined together to have its image data approximation error sum minimized. The process determines first which one of the small sized sub-blocks and then which pixel location within that sub-block is to have its printable choice exchanged for an alternative one. This process is repeated until the larger sub-block in question achieves its minimum total error sum. The procedure of error minimization over ever larger sub-blocks of pixels can be continued until at the largest size block the error minimization is to be carried out for the total image data print error sum of the whole block.

As a further refinement of the print error minimization procedure, any residual print error from each processed block is passed on to neighboring unprocessed image data blocks to attain a smoother large area gray scale reproduction.

BRIEF DESCRIPTION OF THE DRAWINGS

The novel features believed characteristic of this invention are set forth in the appended claims; however, this invention can be best understood by referencing the Detailed Description of the Embodiment together with these drawings.

FIGS. 2a–2d illustrate the image data transformation from the initial scanner intensity data to the unit chosen for computations.

FIGS. 3a–3p illustrate the computational steps of the present invention.

FIGS. 4a–4b constitute a flowchart for the processor operation;

FIGS. 5a–5e illustrate the construction of a screen function;

DETAILED DESCRIPTION OF THE DRAWINGS

Figure 1:
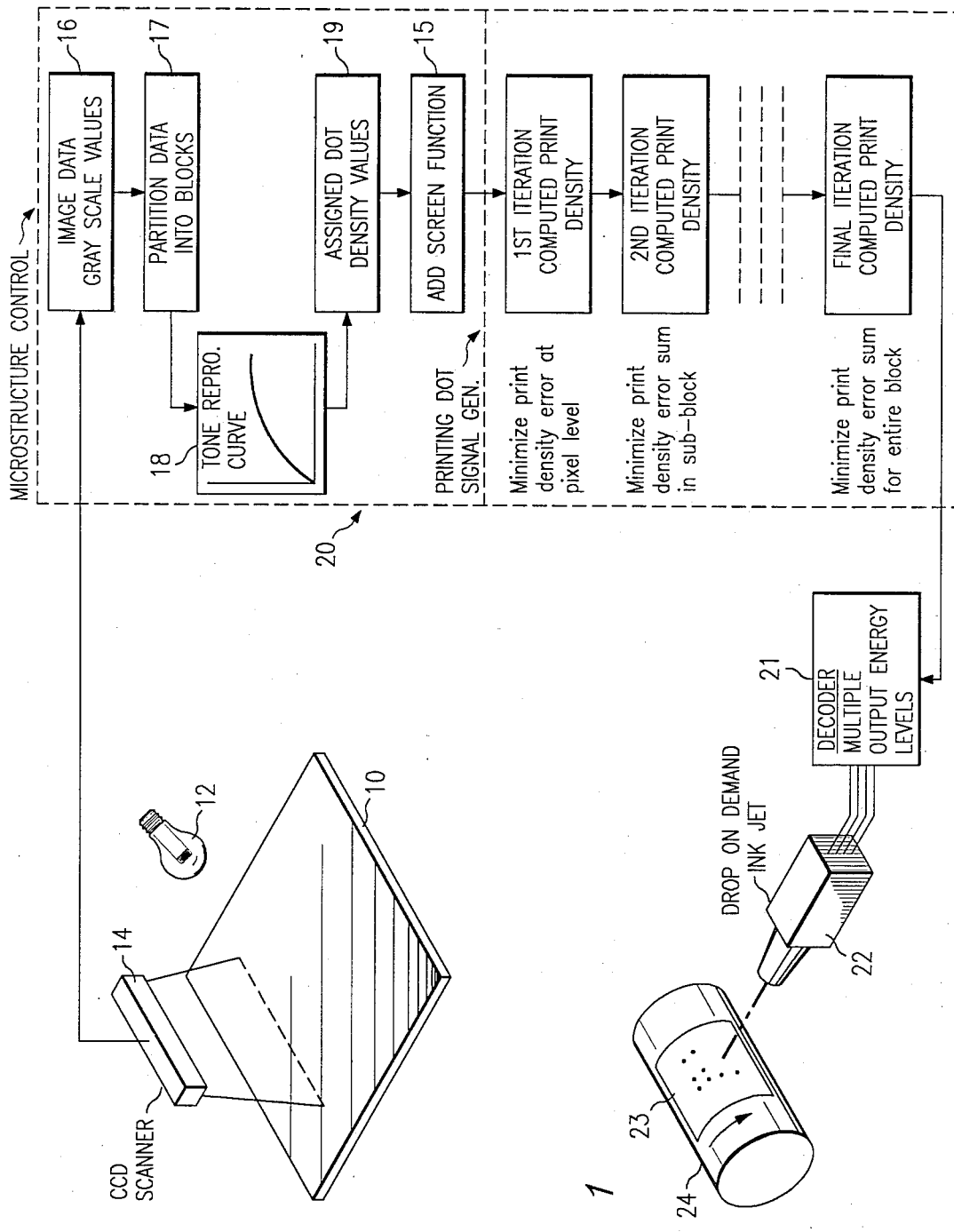
FIG. 1 is a block diagram illustrating the image reproduction system.

Referring now to FIG. 1, the reproduction apparatus includes an image contained on an image display or supporting device 10. The display 10 is illuminated by a light 12. The image is scanned by a CCD scanner 14 for producing image data of gray scale values 16. The CCD scanner can be any typical high resolution electronic digitizing camera such as, for example, the Data Copy Model 610, or an Eikonixscan 77/99M digital image processing vidicom camera.

The page of image data is partitioned into disjoined blocks (e.g., 6×6 pixels) and each block processed separately. Each block of image data is transformed according to a predescribed tone reproduction curve 18 to a set of assigned density values 19 within a processor 20. Next a screen function 15 is added to the image data block for micro-structure control. The processor in accordance with instructions hereinafter described outputs a coded image having minimal density errors at the total array level to a decoder 21 that controls a drop on demand ink jet 22 to produce the reproduced image 23 on a medium 24. Although the invention is described in connection with the above apparatus it will be appreciated by those skilled in the art that the general image print dot placement scheme with included micro-structure control techniques has many obvious applications in graphic arts, computer graphics, and facsimile transmission of images. For text and line graphics, the appropriate input pixel data is the per cent pixel area occupied by the text or line graphics image. The present invention when applied to text and line graphics image data processing will automatically create anti-aliasing compensated print data. This is due to its ability to utilize the intermediary gray print density or intensity levels in the computational procedure to create the optimum print data.

More specifically, the present invention has applications to non-impact printers in electronic publication systems. It also has obvious applications to computer displays and facsimile machines. Color printing may be viewed as the superposition of three single color images in the primary colors cyan, magenta, and yellow. The present invention has the ability to generate these single color images using different halftone and random dot placement patterns such that the superimposed single color images will not show any Moire patterns. Finally, the present invention may also be incorporated into the operating system of a computer as a graphics operator for the automatic processing of scanned images as well as text and line graphics.

The reproduction apparatus includes a "look up" table function (FIG. 2), which transforms the input image data into dot density units for computations, an image processing instruction means for implementing an image processing algorithm with micro-structure control, and transmitting the computed digital data to the decoder 21 (FIG. 1) which generates the control signals for the ink jet printer 22 to place dots on the receiving medium 23 affixed to a rotating drum 24 which both rotates and translates longitudinally by the ink jet head 22.

Construction of Look Up Table

Input image data can be either scanner generated intensity data or that derived from mathematically defined geometric shapes as in the case of text or line graphics. For the first case it is necessary to transform the input data from the measured intensity units to that of the units employed in the image processing computations such that any desired tone level enhancements may also be incorporated. In the following, a procedure for generating such a transformation will be given with reference to FIGS. 2a–2d. The treatment for the second type of data is obvious and need not be described.

FIGS. 2a–2d illustrate the key steps in transforming the input intensity data to that of the dot density units used in the actual image processing computations. FIG. 2a represents the measured intensity to density response of the CCD scanner 14. FIG. 2c represents the actual experimental printer data relating the dot density to measured tone density. This is obtained by taking the tone density measurements of areas printed according to the outputs of image processing computations using constant dot density values as inputs. FIG. 2b is an input to output tone density transformation curve which the user can specify to achieve any desired image enhancements effects. The construction of the composite function (FIG. 2d) from the the three curves (FIGS. 2a, 2b, and 2c) and can be readily followed from point A representing an input intensity value, through points B, C, D, E, F, and G. The desired input intensity to dot density transformation, here represented by the dot H, has the coordinate values (A,G). The composited curve so obtained is generally given in look up table form for incorporation into the memory of the processor 20. Thus, the look up table in fact incorporates both 18 and 19 of FIG. 1 into a single process.

For computer displays one can similarly construct a look up table in intensity rather than density units. Finally, for text fonts and line graphics, the natural input unit is the per cent pixel area coverage occupied by the graphic stroke. A look up table can be similarly set up relating per cent pixel area coverage to that of the dot density values.

Image Processing Algorithm

Before the input image data is presented for image processing computations, it is first transformed into dot density units which are the units chosen for the computations. For example, dot density may be interpreted as the normalized theoretical density value with a range between zero and one, where a zero corresponds to a no printed dot and a one corresponds to a black printed dot. The printer is assumed capable of a multiple number of print density levels (or discrete dot sizes) and these are assigned values $d_0, d_1, \ldots d_n$ in dot density units. The number $(n+1)$ is the number of print levels and its minimum value is two for the binary case. According to the present convention the print levels $d_0$ and $d_n$ correspond to normalized dot density values of zero and one respectively. The assignment of the intermediary values $d_1, \ldots d_{n-1}$ is in accordance to their print density gray levels between white and black.

Figure 6:
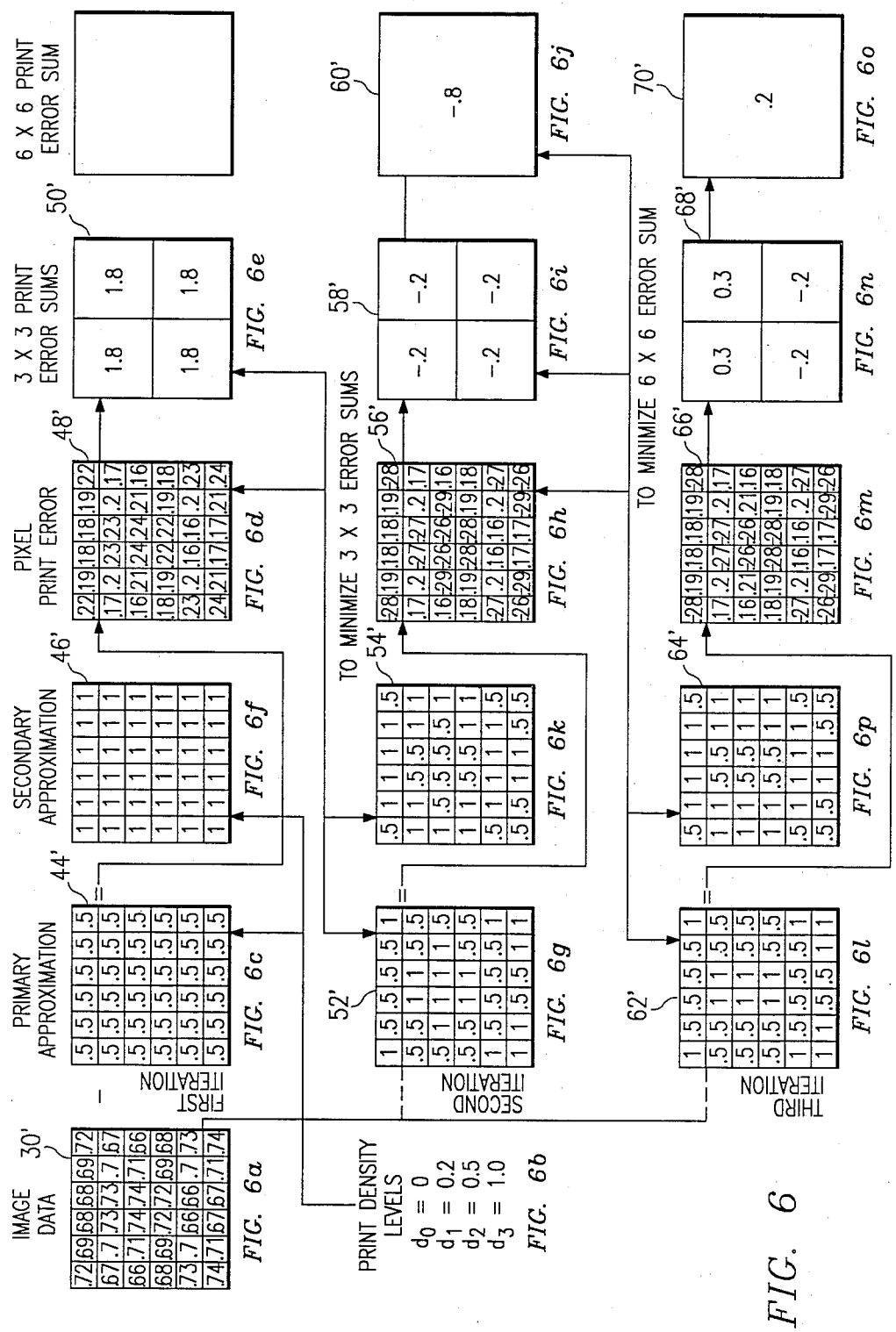
FIGS. 6a–6p illustrate the influence of the screen function in dot assignment for the same image data of FIG. 2.

A page of image data in dot density units is partitioned into adjoining image data blocks (FIGS. 5a–5e). The choices for such blocks are many. The simplest form is a square (FIGS. 5d and 5e) or rectangular matrix image data block. Other forms of image data block may be diamond shaped (FIG. 5a). The criterion is that each and every image data of the image page must be contained in one and only one of the chosen partitioning image data blocks. Next, a screen function consisting of appropriately chosen small numerical values (FIGS. 5c and 5e) is added to the image data (in dot density units) block (FIGS. 3a and 6a). The small numerical values will not substantially change the image tone level, however, they do influence the location of the print dot placements such that halftone patterns are automatically formed over image areas of constant density.

In the image processing computations each block of image data is treated individually. Each block of image data is partitioned into sub-blocks and each sub-block further partitioned into still smaller sub-blocks and so on until the smallest sub-block possible is reached, which is the individual pixel locations. In the case of the 6×6 pixel block of FIG. 5e, for example, the 6×6 block can be further partitioned into four sub-blocks of 3×3 pixels each, and each sub-block still further positioned into nine individual pixels as the smallest sub-block. The goal of the computations is to choose for each pixel location one of the print density levels as the approximation to the image data there. The choice of which one to select is by recursively applying error minimization principles first at the individual pixel level, then at the next larger sized sub-block level, and so on until the sum of the individual print errors for the whole block has been minimized.

The complete computational steps are as follows:

First, all image data must be between white and black and therefore the corresponding assigned dot density values must all fall between $d_0$ and $d_n$. For each image data of the block, generally there exists two consecutive print density levels that bracket the given image data. These two print density level values then become the only allowable choices of approximation to that image data value. That is, in all the following computations, one of these two values will be chosen to approximate that image data and none of the other print density levels can be used for that purpose. In the special case where the image data is exactly one of the print density levels, then that print density level plus one other suitable choice are the allowable approximation candidates. The other choice will have no effect on the computational results hence one can chose it to be either the same print density level again or one that is next to it.

Secondly, between the two choices found above generally there is one that is closer to the given image data. The closeness here is measured in terms of the magnitude of the difference between the image data and the approximation candidate. During the initial computational iteration the one that is closer to the image data is selected to be the primary choice and the other the secondary choice. In cases where both choices are equally close to the image data then either one may be selected as the primary choice. The importance of the primary choice here is that it represents the one that minimizes the magnitude of the individual pixel print error, which is defined as that of the image data value minus its selected primary choice print density level value.

The primary choice can be either greater than or less than the image data dot density value. The individual pixel print error therefore may either be positive or negative. The difference between the image data value and that of the secondary choice is necessary of the opposite sign since the two allowable choices bracket the image data. An alternative view is that if the primary choice represents an over print of image data then the secondary choice represents an under print and vice versa. This computation of selecting the primary and secondary choices of the approximation as well as the calculation of the individual pixel print errors is performed for all the image data of the block under consideration.

Thirdly, while the previous computations select the print density levels that minimize the individual pixel print errors, this step aims to minimize the average print errors over each sub-block by using the neighboring individual pixel print errors to cancel each other. In doing so certain sacrifice has to be made of the best individual pixel print approximation in exchange for the lowest sub-block print error sum. The procedure for minimizing the sum of the print errors over each sub-block is as follows: First the sum of the individual print errors in the sub-blocks is computed and its sign determined. Next, the individual pixel within the sub-block with the largest individual print error of the same sign is located. A switch is made at that pixel location between the primary and secondary choices and then the individual print error as well as the sub-block print error sum recomputed. If the switch reduces the magnitude of the sub-block print error sum then it is accepted and the same procedure is repeated all over again to further reduce the sub-block print error sum. Such iteration is terminated whenever a switch does not reduce the magnitude of the sub-block print error sum and therefore is rejected. The computation to minimize the sub-block print error sum is to be carried out for all the sub-blocks of the given image data block under consideration.

Fourthly, the print error sum over each of the next larger sized sub-blocks is minimized. Each of such sub-blocks in turn are composed of several smaller sized adjoining sub-blocks encountered in the previous section. Again, the print error sum of the sub-block presently under consideration is computed and its sign determined. Then the next smaller sized sub-block with the largest print error sum of the same sign is located and within it the individual pixel with the largest individual print error of the same sign is also located. A switch is made at that individual pixel location between the primary and secondary choices of the approximation and all print error terms recomputed accordingly. If the switch reduces the magnitude of the print error sum of the sub-block presently under consideration then it is accepted and the error terms updated. This computation is then repeated all over again for the same sub-block until no further reduction of the print error sum can be obtained. The termination condition again is associated with the rejection of a switch between the primary and secondary choices of the print approximation at which time a minimum print error sum status will have been achieved.

Lastly, the same concept of error minimization over ever larger size of sub-blocks within the image data block is carried out recursively and iteratively until the sub-block under consideration is the given image data block itself. At the conclusion of the computations the absolute value of the print error sum for that block should be smaller than that of the largest of the print density level increments. If not the iterative error minimization computations should not have been terminated. One can obtain an estimate of the averaged per cent print density level error by dividing the largest print density level increment by the product of the total number of pixels within the block times the total print dot density range. Such error estimates are useful for choosing the right size of the partitioning block for image processing computations.

Figure 4B:
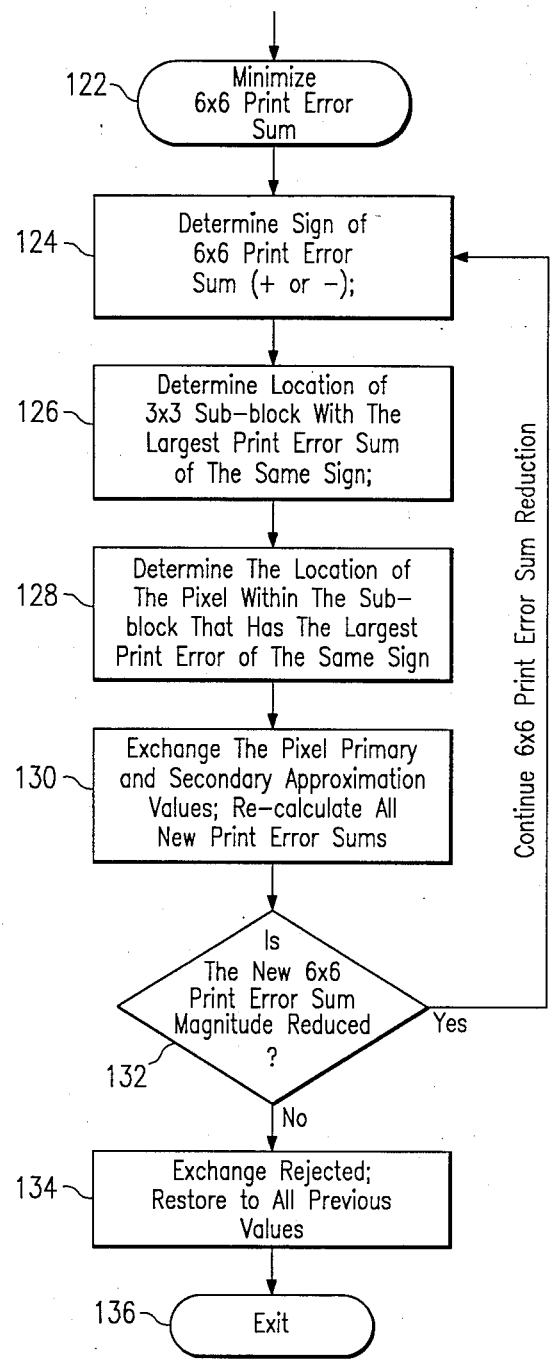

The flowchart of FIGS. 4a and 4b illustrate by way of an example the operation of the processor 20. The processor input parameters set the size of the block. In our example, a 6 by 6 pixel matrix forms the data block 30 (FIG. 3a). The processor parameters also define the size of the partitions dividing the block into sub-blocks and each sub-block, into individual pixel sub-blocks.

Thus, by choice the 6×6 block is partitioned into four 3×3 sub-blocks 32, 34, 36, and 38, and each sub-block is partitioned into nine individual pixel sub-blocks 40. It should be understood that this choice of the image data block size and its partitioning into sub-blocks is only intended as an example facilitating the description of the invention.

At start 100 (FIG. 4a) an instruction 102 is issued to generate and store in memory the image data block 30 (FIG. 3a) from its corresponding input of scanned data according to the look up table derived in FIG. 2 and stored in memory. For the present example of FIG. 3, the step 105 is ignored. In the example, the image data block consists of the same pixel value 0.7 as representative of a constant density block to demonstrate hereinafter the dot location feature of the invention.

Next, instruction 104 is issued to compare the pixel values of the block 30 (FIG. 3a) to a print density level table 42 (FIG. 3b) stored in memory and generate primary and secondary blocks 44 and 46 (FIGS. 3c and 3f) of pixel 40 approximation values corresponding to block 30. These values are also stored in memory. The processor determines the print density levels bracketing the pixel 40 value and selects 0.5 as the primary approximation, as it is closer to the 0.7 pixel value than 1.0 which is chosen for the secondary approximation.

Then, an instruction 106 is issued to algebraically subtract the pixel values of the primary approximation block 44 (FIG. 3c) from the pixel values of the image data block 30 (FIG. 3a) to determine a corresponding block 48 of pixel print errors (FIG. 3d) for storage in memory, and each 3×3 sub-block pixel print error sum values (FIG. 3d) are added together to generate the 3×3 sub-block error sums for a block 50 (FIG. 3e) for storage in memory. Each 3×3 print error sum block thereof thus has a value of +1.8 (9×0.2). At the second iteration 108 (FIG. 4a) the 3×3 print error sums (FIG. 3e) will be minimized one at a time starting with block 32, which is the first quadrant. This minimization procedure is done iteratively and only one pixel at a time. Thus, an instruction 110 is issued to determine the sign of the 3×3 print error sum of the quadrant presently under consideration and found to be positive (+) (FIG. 3e). Then instruction 112 is issued to search within the same quadrant 32 for that pixel with the largest individual print error of the same sign (+). As the pixel print error values there are all equal, the choice is therefore by the order of the processing. The normal order of processing is by rows and within each row from left to right. Thus, the first element processed is located at the first row and first column. Next, instruction 114 is issued to interchange the primary and secondary approximation values (FIGS. 3c and 3f) at that pixel location and recompute first its individual pixel print error and then the new 3×3 error sum for that quadrant and store all results in memory. At this point, the pixel at row one and column one should have 1 for its primary approximation, 0.5 for its secondary approximation, −0.3 for its pixel print error, and 1.3 for the first quadrant print error sum. Obviously the new value of the 3×3 print error sum for the quadrant can still be further reduced. Thus, an instruction 116 is issued to test whether the just completed computation has reduced the previous 3×3 print error sum and it is found that it has; therefore return is made to instruction 110 and instructions 110-116 repeated to reduce the 3×3 print error sum of that first quadrant to its minimum value.

In our example, the second time the instructions 110 to 116 are executed another exchange is made at first row second column pixel location and a further reduction of the 3×3 print error sum is made to 0.8. Again, instruction 116 directs that instruction 110-116 be repeated to further reduce the 3×3 print error sum. After four such repetitions the first four pixel locations in the first quadrant have all been switched (FIGS. 3g and 3k), their print errors changed to −0.3 (FIG. 3h), and the 3×3 print error sum changed to −0.2 (FIG. 3i). As the fourth repetition still tested to have reduced the 3×3 print error sum from its previous value, instruction 116 directs that a fifth repetition beginning with instruction 110 be undertaken. However, this time the resulting new 3×3 print error sum magnitude has increased. Thus, decision 116 is no and an instruction 118 is issued to reject the last switch and restore all appropriate values to those of the previous switch. This completes the 3×3 print error sum minimization for that quadrant.

Next, a decision 119 is made whether all the 3×3 print error sums have been completed. If no, a return to instruction 108 is made and steps 108-118 repeated until the remaining 3×3 print error sums of the remaining quadrants are similarly minimized. When all 3×3 print error sums have been minimized the primary approximation block 52 (FIG. 3g), the secondary approximation block 54 (FIG. 3k), the pixel print error block 56 (FIG. 3h) all assume values that minimize the four 3×3 print error sums of block 58 (FIG. 3i). After the decision 119 is made that all 3×3 print sub-blocks have been minimized, an instruction 120 is issued to generate the 6×6 print error sum (FIG. 3j) for the image data block 30 as the sum of the latest 3×3 print error sums and a third iteration begun to minimize the 6×6 print error sum.

At the third iteration 122 an instruction 124 is issued to determine the sign of the present 6×6 print error sum block 60 (FIG. 3j) to be minimized. Next, an instruction 126 is issued to determine which quadrant has the largest 3×3 print error sum of the same sign. Since, in our example, they are all equal the first quadrant is chosen. Then instruction 128 is issued to search for the pixel in the first quadrant of block 56 (FIG. 3h) having the largest print error of the same sign (−). Again, the first pixel at first row and first column is chosen. An instruction 130 is then issued to interchange the primary and secondary approximation values at that location and compute the new pixel print error for that location (FIG. 3l, 3p, and 3m) as well as the new 3×3 print error sum for the first quadrant (FIG. 3n). The result is a new 6×6 print error sum of −0.3. Next, a decision 132 is made whether the new 6×6 print error sum is smaller than the previous value in magnitude; if yes a return is made to instruction 124 and instructions 124-132 repeated until the 6×6 print error sum is reduced to a minimum. In the example, the second repetition results in a switch at the first pixel position within the second quadrant. Thus, the primary and secondary approximation blocks 62 and 64 (FIGS. 3l and 3p) and pixel print errors block 66 (FIG. 3m) yield the new 3×3 print error sum block 68 (FIG. 3n) and a new 6×6 print error sum (FIG. 3o). However, because the second repetition caused a further reduction of the previous 6×6 print error sum, return is made again to instruction 122 and instructions 124-32 repeated once more. This time, however, the switch would cause an increase in the magnitude of the new 6×6 print error sum and, therefore, it is rejected and the decision 132 is no. With a no decision an instruction 134 is issued to restore all values to those of the preceding switch and exit 136 is made.

When exited from instruction 136 the minimum 6×6 print error sum for the image data block has been determined. The final primary approximation block 62 (FIG. 31) is stored as the data according to which the print instruction is issued for decoding in decoder 22 and reproducing the original image.

The above computational algorithm reduces substantially the averaged print error for the whole image data block 30. Nevertheless, the dot placement pattern resulting from this technique still does not provide the fine print quality necessary for a printed image, for example. The reason for this is that in the areas of relatively constant image density such as used in the example of FIGS. 3a–3o the execution sequence rather than the image content determines the dot assignment positions. Thus, the micro-structure control feature now to be described is used.

Micro-Structure Control

In image areas of constant density the placement of the dots depends more on the order of execution rather than the density value of each pixel. That is, those pixel positions that were querried first by the processor gets the dots. To achieve better image quality it has been found that the placement of the dots is critical and must follow either specifically chosen halftone or smooth random patterns. Thus, over image areas of relative constant density, it is desired that the dot assignment follow a certain smooth looking pattern; while over image areas of rapid density changes, the dot assignment should reflect those of the image content. Two novel techniques will now be described to achieve this result. The first is to modify the image data block with the addition of a screen function which influences the dot placement to take on specific patterns only for image areas of relative constant density. This is accomplished without altering the averaged local density. The second approach modifies the specific computational step to achieve a smooth random dot patterning.

FIG. 5b is an example of the desired sequence of placing the dots within the halftone when the image data there represents an area of constant density. Thus, it is desired that the image process computations will begin to assign the printed dots first at the 1 position, then the 2 position, and so on. If the total number of dots assigned to the halftone is less than the number of its cells there, then those cells marked with high numbers will be left blank.

A screen function is developed in light of whether the entries of an image data block are all approximately the same. In this scenario, the chances of being assigned a dot at a particular pixel position (location) by the processor is enhanced by artificially increasing its value above that of the others. Similarly, a decrease in the image data value will diminish the chances of getting a dot placed at that pixel location. Thus, a screen function such as FIG. 5c when added to the image data causes the print dots to be assigned according to the priority order of FIG. 5b starting at the center of the halftone cell.

The delta ($\delta$) is a small positive number chosen only to influence the order of dot placement by the computational steps of FIGS. 4a–4b and must not have a value sufficient to substantially alter the image density at each pixel position. The preferred choice for delta is approximately the level of the scanner noise. Thus, the essential difference of the present screen function and the prior art screen functions is that the numerical values of the screen function of the present invention are relatively small numerical values which become effective only when used in conjunction with the disclosed computational algorithm to influence the dot placement for image data blocks with constant density entries. For an image data block with greatly varying density entries, the dot placement is in accordance with the image data density values, this is because the small numerical values of the screen function will not be sufficient to cause any change. Thus, the combination of the screen function and the computational steps allows the production of halftone cell patterns over constant density image areas as well as the production of fine image details with sharp edges represented by greatly varying density values.

For convenience of computations, it is easier to use the 6×6 image data block of FIGS. 6a–6p rather than the diamond shaped data block (FIG. 5c). Thus, each 6×6 block contains one halftone cell 72 plus the parts from four neighboring halftone cells. The screen function for the 6×6 block 74 (FIG. 5e) is derived from that of FIGS. 5c and 5d combined. It is to be noted that the sums of all entries of both FIGS. 5c and 5e are zero. That is the addition of the screen function to the image data will not alter the number of printed dots within the image data block. Hence, the screen function does not change the averaged print density for the image data block.

Thus, in this embodiment the parameters input into the processor include a screen function block having the individual pixel values of FIG. 5e wherein the delta value is +0.01. Thus, the instruction 102, (FIG. 4a) to generate and store in memory the image data block 30 (FIG. 3a) from its corresponding input of scanned data, and instruction 103 to transform the data into dot density units, is followed by instruction 105 to add the screen function block (FIG. 5e) to produce the modified image data block 30' (FIG. 6a). The remaining instructions of the flowchart are identical. This will become apparent in connection with a description of FIGS. 6a–6p, from which it will be noted that the primary approximation block 44' (FIG. 6c) and the secondary approximation block 46' (FIG. 6d) values are identical to those of the corresponding blocks 44 and 47 (FIGS. 3c and 3f), but that the pixel print error block 48' differs to reflect the screen function block. Further, the 3×3 print error sums for blocks 50', 58', and 68' (FIGS. 6f, 6j and 6o) and the 6×6 print error blocks 60' and 70' (FIGS. 6k and 6p) have values identical to those of the corresponding blocks 50, 58, and 68, and 60 and 70 (FIGS. 2e, 2i, 2n, and 2j and 2o). However, the final dot placement pattern (FIG. 61) is different from that of FIG. 21. Nevertheless, the number of dots for the block and the print error sum for the block remain the same.

Although the example of FIG. 5e is a screen function intended to be used for all image blocks of the same image page, the concept of the screen function can be varied to include variable screen functions. Thus, the screen function may vary from one image data block to another. This may be necessary when halftone screen patterns with arbitrary angles are desired. For each image data block location within the image page, a different screen function can be constructed with reference to the local halftone cell pattern and added to the image data by instruction 105 prior to image processing. This construction involves the determination of the order of dot placement within the image data block, and then assigns a descending sequence of numerical values to the block to the established dot placement order.

Figure 7:
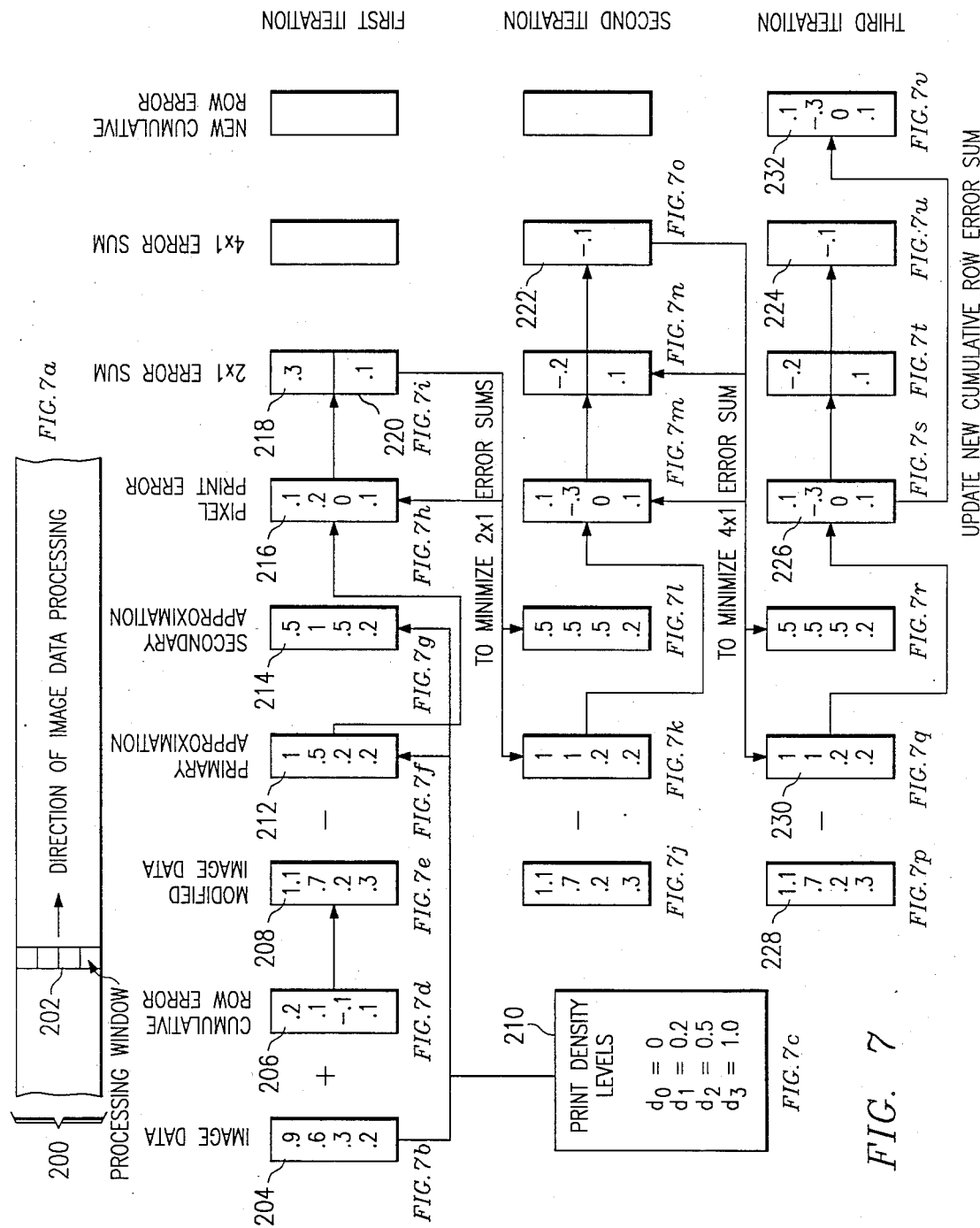
FIGS. 7a–7v illustrate the computational steps for the random dot pattern.

By way of an example and referring now to FIGS. 7a-7v, the second technique of micro-structure control to form smooth randomly spaced dot patterns includes, for example, four lines 200 of image data and the processing is done in block 202 of 4 by 1 pixels starting from the left edge of the image page and progressing to the right as shown in FIG. 7a. For later computations the 4×1 blocks are first partitioned into two 2×1 sub-blocks, and each 2×1 sub-block is further partitioned into two individual pixel blocks as the smallest sub-blocks.

The principal modification in the computations of this embodiment is the introduction of cumulative row errors which are to be added to the present print errors to form modified print error for the subsequent error minimization computations. Thus, initially at the left edge the cumulative error sums are all zero.

Then, as in the prior flowchart, an instruction is issued to construct an image data block 204 (FIG. 7b) and to add the cumulative row error sums 206 (FIG. 7d) to the values of the image data (FIG. 7b) to produce a modified image data block 208 (FIG. 7e). Then an instruction is issued to compare the data of the image data block 204 (FIG. 7b) to a table of print density levels 210 (FIG. 7c) for the selection of the candidates of primary and secondary approximation print density levels which bracket each image data value. The candidate that is closer to the modified image data is chosen for the primary print approximation as set forth in block 212 (FIG. 7f); the other selection becomes the secondary approximation as set forth in block 214 (FIG. 7g).

Next, an instruction is issued to subtract algebraically the primary approximation data (FIG. 7f) from the modified image data (FIG. 7e) to form the pixel print error block 216 (FIG. 7h). To complete the first iteration, an instruction is issued to form 2×1 blocks 218 and 220 and add the values thereof to form a block of 2×1 error sums (FIG. 7i).

A second iteration to minimize the 2×1 print error sums 218 and 220 (FIG. 7i) is performed by following the interconnecting arrows. Because the addition of the cumulative row error to an image data to form the modified image data of block 208 (FIG. 7e) may cause it to have values outside the printable range, it is necessary that the pixel candidate for switching must also obey an additional condition; i.e. at that pixel location the sign of the numerical value obtained by subtracting the secondary approximation from the primary approximation must be opposite to that of the sign of the sub-block error sum. Otherwise, the pixel is rejected as the candidate and another pixel is sought in its place. With the 2×1 sub-block error sum thus minimized, next a 4×1 error sum block 222 is determined. A third iteration is performed to minimize the 4×1 error sum (FIG. 7o), which in the example happens to be the minimized value itself set forth in block 224 (FIG. 7u). Otherwise, the iterations are continued substituting secondary approximation values selectively until the minimum 4×1 error sum is determined.

Finally, the latest pixel print errors of block 226 (FIG. 7s) are derived as the difference of the modified image data of block 228 (FIG. 7p) and the latest primary approximation data of block 230 (FIG. 7q). The pixel values of block 226 (FIG. 7s) form the block 232 (FIG. 7v) of new cumulative row error sums to be used for the computations for the next image data block.

Although a 4×1 image data block has been used in our example, the procedure allows immediate generalization to M by N pixel blocks where each block is further partitioned into a nested set of sub-blocks. Preferable practice is to use many rows and few columns such as 8 by 1 or 9 by 2 rows and columns of pixels.

It will be appreciated by those skilled in the art that as color printing may be viewed as the superpositioning of three single color images (cyan, magenta, and yellow) the present invention can be used to generate these single color images using different halftone and random dot placement patterns such that the superimposed single color images will not show Moire patterns.

Although several embodiments of the invention have been described, it will be apparent to a person skilled in the art that various modifications to the details of construction shown and described may be made without departing from the scope of this invention.

What is claimed is:

1. An image reproduction apparatus comprising:
   (a) a data image means for producing a gray scale pixel value for each pixel of a data image of a scene; and
   (b) a data image processing means connected to the data image means, the data image processing means including a micro-structure control means connected to the data image means for determining dot positions, and a printing dot signal generating means connected to the micro-structure control means and responsive to the gray scale pixel value of the data image for selectively producing a printing dot signal for each pixel.

2. An image reproduction apparatus according to claim 1 wherein the printing dot signal generating means for a plurality of iterations includes a first means connected to the micro-structure control means for determining primary and secondary print density levels for each pixel of a data image block, said primary and secondary print density levels being above and below the density level of the pixel with the one closest to the value of the pixel being the primary print density level, a second means connected to the first means for determining the errors between the data image pixel values and the corresponding primary pixel print density values of the block, a third means connected to the second means for summing the block of pixel print errors by sub-groups and determining the algebraic sign of each sub-group; a fourth means connected to the third means for selecting the sub-group having the largest print error value of the same sign, a fifth means connected to the fourth means for exchanging the primary and secondary print density values at the pizel location thereof having the largest error value and the same sign, and sixth means connected to the fifth means for determining whether the sum is less than the first sum, and seventh means connected to the third means for reactivating the third means until the sixth means determines the minimum sum.

3. An image reproduction apparatus according to claim 2 wherein the printing dot signal generating means further includes a second iteration means for minimizing the print error sums of pixels forming sub-blocks of the block of pixels.

4. An image reproduction apparatus according to claim 3 wherein the printing dot generating means further includes a third iteration means for determining whether the block sum of the sub-blocks of the second iteration is the minimum block sum.

5. An image reproduction apparatus according to claim 1 wherein the micro-structure control means for determining dot positions includes means for adding a screen function to the data image, said screen function having a value sufficient for dot positioning purposes only.

6. An image reproduction apparatus according to claim 1 wherein the micro-structure control means for determining dot positions includes means for modifying the dot signal value by adding residual print error values for a preceding block for achieving smoother random dot patterning.

7. An image reproduction apparatus comprising:
first means for scanning a scene and producing intensity data representative of the scene;
second means connected to the first means for transforming the intensity data to dot density units representative of their print density gray levels between white and black;
processing means including a first means for adding a screen function to the data image, and a second means connected to the first means for producing a dot signal for each pixel of the image;
decoding means connected to the processing means for decoding the processed dot signals; and
means connected to the decoding means for reproducing the image responsive to the intensity data representative of the scene.

8. A method of processing signals representative of a scene into an improved image of the scene consisting of the steps of:
scanning a scene with a scanner for producing a data image block of gray scale image data signals;
storing the block of gray image data signals in a storage means;
comparing the gray scale image data signals with look up table signals for determining primary and secondary print density levels for each pixel of the data image block, said primary and secondary print density levels being above and below the density level of the pixel signals with the one closest to the actual value of the pixel being the primary print density level signal;
generating a data image pixel print error block of signals by comparing the value error signals of the data image pixels and the corresponding primary approximation pixel print density value signals of the block for minimizing the individual pixel print error signals;
dividing the block in to a plurality of sub-block level signals each level having a preselected number of sub-blocks;
minimizing the average print error signals over each sub-block of the smallest group of sub-blocks by determining the sum and sign of the individual print error signals in the sub-blocks; locating by signal comparison the individual pixel within the sub-block with the largest individual print error signal having the same sign, substituting the corresponding secondary approximation value signal, redetermining the individual print error signal and sub-block print error sum signal; and repeating to reduce to a minimum the sub-block print error sum signals; and similarly minimizing the average print error signals of the group consisting of the image data block signals and any intermediate sub-blocks for minimizing the pixel error sum signal for the image data block.

9. A method of processing image data signals wherein each pixel data signal thereof is to be used for producing a dot for printing or displaying as a dot, comprising the steps of:
(a) obtaining and storing in an image signal memory means image data signals representing pixel element gray scale values of a scene;
(b) partitioning said image data signals into adjoining signal arrays, each pixel image data signal being included in one and only one of the signal arrays;
(c) preprocessing each array of image data signals for tone level enhancement and print dot pattern microstructure control;
(d) comparing each image data signal to a plurality of discrete print density value signals and selecting two candidates of print value approximation signals bracketing the said image data signal;
(e) selecting for each image data signal the closer of the two candidates as the primary print value approximation signal and the second candidate as the secondary print value approximation signal;
(f) forming a print error signal array by comparing the image data array to the primary print value approximation signal array and storing the difference signals as the print error array; and
(g) further adjusting the primary print value approximation signal array to reduce the sums of print error signals, each sum signal for a unique error subarray signal formed within the error signal array.

10. A method according to claim 9 wherein step (f) includes the steps of:
(1) partitioning the image data signal array, the primary and the secondary print value approximation signal arrays, and the print error signal array into a plurality of mutually exclusive subarrays;
(2) processing the primary and secondary data signals into signals representative of the print error sum for each subarray including its sign (+ or −);
(3) minimizing the print error sum signal magnitude for each subarray using an iterative procedure until no further reduction in the signal values can be made, said minimization method includes the steps of:
(a) selecting amongst a plurality of smaller sized signal subarrays within the subarray presently under consideration that one which has the largest print error sum signal with the same sign determined in step (2) above, then repeating recursively the procedure to the newly selected subarray until the nested operation determines a smallest subarray possible, which is a single pixel value signal;
(b) minimizing the said print error sum magnitude signal by interchanging at the pixel location found in step (a) above the primary and secondary print value approximation signals for producing signals representative of all print error values affected by the interchange;
(c) repeating steps (a) and (b) above until such a time when an interchange at step (b) causes an increase rather than decrease in the print error sum magnitude signals; at which time all signal values affected by the interchange are restored to the previous values before the interchange and the iteration is thus terminated;

(4) repartitioning the image data signal array, the primary and secondary print value approximation signal arrays, and the print error signal array into a plurality of next larger sized subarrays each containing several subarrays of the size previously encountered;

(5) repeating steps (2) and (3);

(6) repeating steps (4) and (5) until the next larger sized subarray signal is the image data signal array, then repeating step (3) to the image data signal array itself; and (7) storing the final primary print value approximation signal array as the data according to which the print instruction to an output device is issued for the correspondingly located image data signal array.

11. A method according to claim 9 wherein step (c) includes the steps of:

(a) transforming image data signals received from a scanner into signals representative of dot density units suitable for processing, said transformation including (i) transforming the dot intensity signals to dot density signals, (ii) further transforming the dot density signals according to a user defined tone reproduction curve, and (iii) transforming the transformed dot density signals of (ii) into dot density signals using a functional relationship between output print density and the dot density units; and (b) further modifying the signals representative of the image data in dot density units by summing signals representative of a user designed screen function to each image data signal array, said screen function consisting of signals representative of an array of small numerical value signals sufficient only to influence the dot placement to form desired halftone patterns over constant density image areas and insufficient to alter the dot placement in image areas with fine local image detail represented by highly contrasting image data value signals.

12. A method according to claim 9 wherein the image data signals are generated from mathematical definition signals representing the per cent area of each pixel cell covered by the line graphics or text stroke for automatically creating anti-aliasing compensated text fonts and line graphic signals when the number of print density or display intensity steps is more than two.

* * * * *